United States Patent Office.

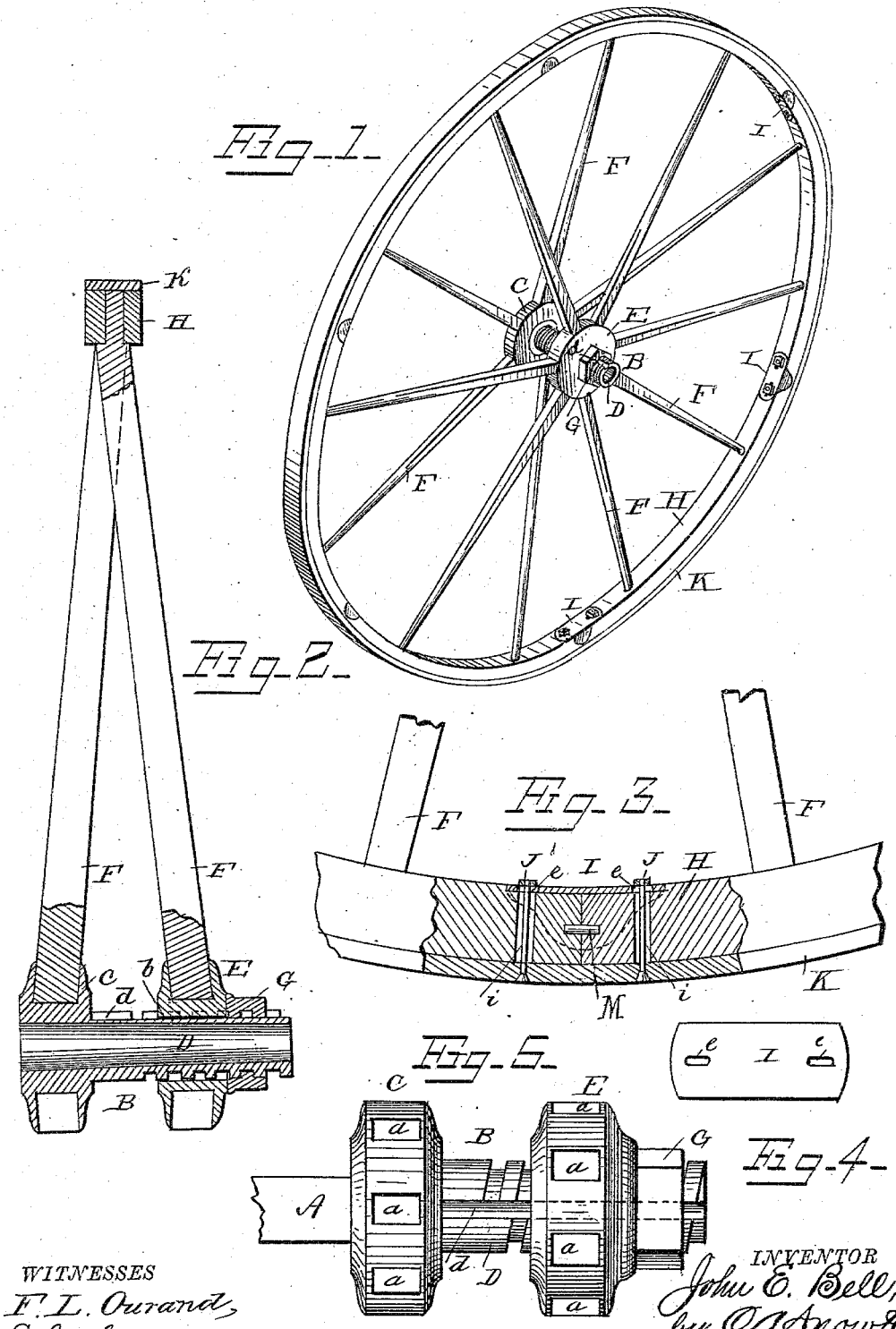

JOHN EDWARD BELL, OF NASHVILLE, TENNESSEE, ASSIGNOR TO JAMES W. COLE AND ROBERT L. ARMISTEAD, BOTH OF SAME PLACE.

VEHICLE-WHEEL.

SPECIFICATION forming part of Letters Patent No. 296,307, dated April 8, 1884.

Application filed August 20, 1883. (No model.)

*To all whom it may concern:*

Be it known that I, JOHN E. BELL, a citizen of the United States, residing at Nashville, in the county of Davidson and State of Tennessee, have invented a new and useful Vehicle-Wheel, of which the following is a specification, reference being had to the accompanying drawings.

This invention relates to vehicle-wheels; and it has for its object to provide means for tightening up the wheel in case it shrinks and the tire becomes loose.

To this end the said invention consists in certain details of construction and combination of parts, as hereinafter particularly set forth, and pointed out in the claim.

In the accompanying drawings, Figure 1 is a perspective view of a vehicle-wheel embodying my improvements. Fig. 2 is a longitudinal sectional view through the hub, showing the attachment of the spokes. Fig. 3 is a view of the rim of the wheel, showing the application of the joint-plate. Fig. 4 is a plan view of the joint-plate. Fig. 5 is a front elevation of hubs, the spokes not being attached.

Like letters refer to corresponding parts in all the figures.

Referring to the drawings, A designates the axle of a vehicle, to which is fitted the hub B of a wheel, the peculiar construction of which will be hereinafter fully set forth.

The hub consists of a head or disk, C, cast at one end with a tubular sleeve, D, the latter having screw-threads formed on its exterior face. A similar head, E, slides over the screw-threaded portion of the sleeve, and is formed with a feather, $b$, which enters a groove, $d$, cut from the screw-threaded portion of the sleeve. Said heads or disks C E are provided with sockets $a$, to receive the spokes F of the wheel, one half of the spokes being socketed in one head, while the remaining half are socketed in the other head. The head or disk E works in and out over the sleeve D, and a set-nut, G, engages with the screw-threaded portion of said sleeve, and is adapted to slide the head E inward when said nut is turned. The other ends of the spokes F are secured in the rim or felly H of the wheel, the ends of the rim being connected together by a joint-plate, I, which embraces the bottom and sides of the rim, and is provided with bolts J, passing through passages $i$ in the ends of the rim, said bolts connecting the joint-plate with the tire K. A dowel-pin, M, is fitted to one of the ends of the rim, and extends outward, so as to work in a recess in the other end, and thus serve to guide the rim as the latter is expanded and contracted.

The operation and purposes of my invention are obvious. The spokes are attached to the felly or rim of the wheel, and are also socketed in the heads or disks of the hub, one half of the spokes being secured in one head, while the remaining half are secured in the other head. The hub is then placed on the axle of the vehicle, the wheel being tightened by turning the nut G, which engages with the exterior screw-threaded portion of the tubular sleeve. When the nut is turned, the sliding head or disk E will be moved inward by the pressure of the nut against the sliding head, the feather of the latter fitting in the groove, so that the sliding head will not turn but will be guided by the feather. The sliding inward movement of head or disk E will cause the spokes attached thereto to press the felly or rim of the wheel in an outward direction. As the felly expands it will draw onto the joint-plate, which will yield to this expansion, so as to increase the circumference of the felly. The bolt J of said joint-plate is permanently secured to the tire, and extends through an elliptical passage, $i$, in the felly outward through a slot, $e$, in the joint-plate. As the felly is pressed laterally outward, the yielding or expansion attachment of the joint-plate allows the felly to increase its circumference, the tire thereby fitting the wheel more closely.

It will be seen that the foregoing devices afford means for tightening the wheel when the latter shrinks or the tire becomes loose, the felly or rim being expanded out to the tire, while all parts of the wheel will be held in an efficient manner.

My improved wheel is simple, durable, and efficient, and can be manufactured at slight expense.

It will be obvious that numerous modifications may be resorted to without departing from the spirit or scope of my invention.

Having described my invention, I claim as new—

In a vehicle-wheel, the rim H, formed with passages i, and provided at one end with a dowel-pin, M, entering a recess in the other end, a joint-plate, I, formed with slots e, and the bolts J, connecting with the tire, and passing through the passages i and slots e, and held in position, as set forth.

In testimony that I claim the foregoing as my own I have hereto affixed my signature in presence of two witnesses.

JOHN EDWARD BELL.

Witnesses:
J. A. CANTRELL,
W. J. CANTRELL.